UNITED STATES PATENT OFFICE.

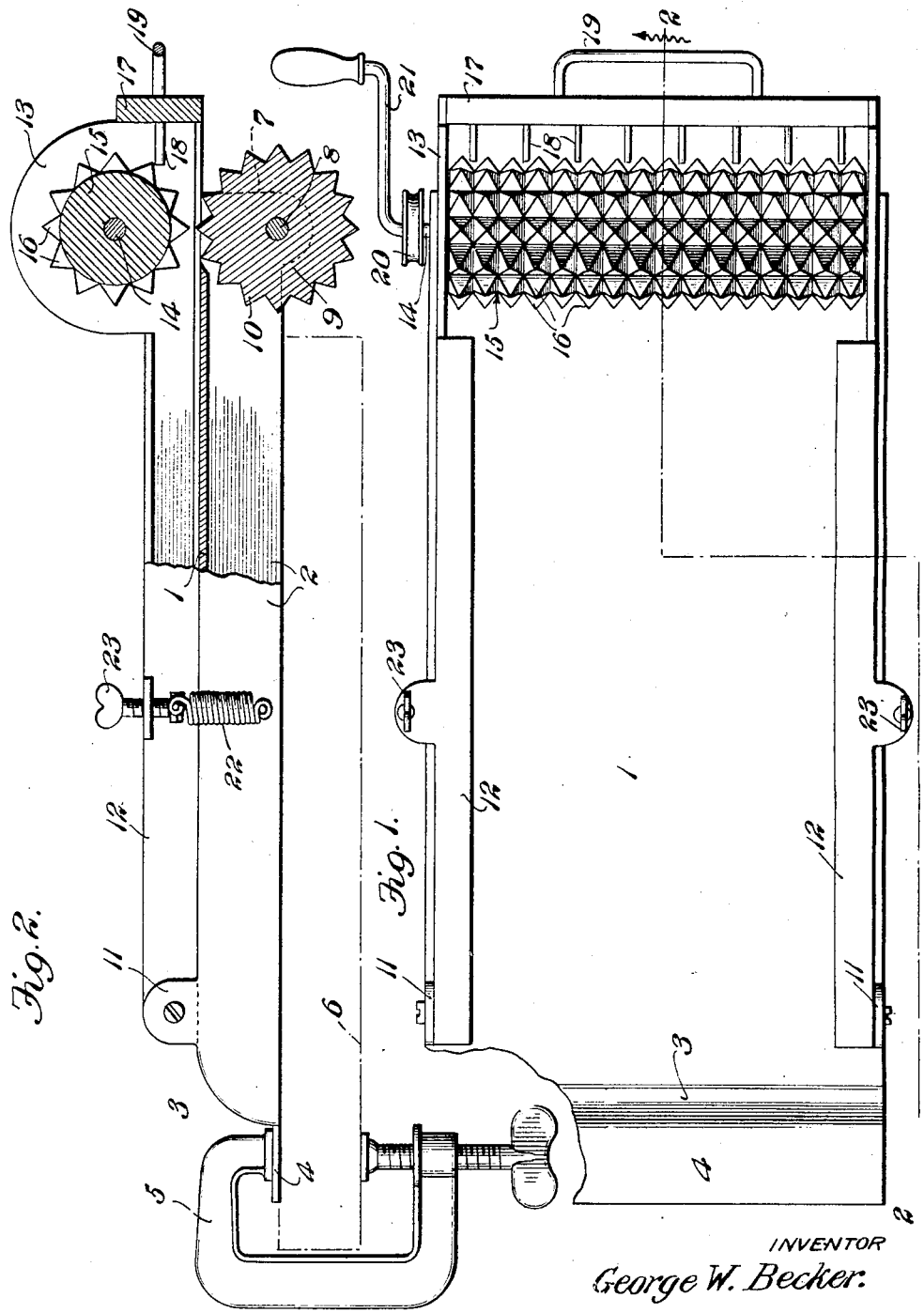

GEORGE W. BECKER, OF MASSILLON, OHIO, ASSIGNOR OF ONE-HALF TO FRED GRABER, OF MASSILLON, OHIO.

MEAT-TENDERER.

1,371,065.   Specification of Letters Patent.   Patented Mar. 8, 1921.

Application filed October 9, 1920. Serial No. 415,870.

*To all whom it may concern:*

Be it known that I, GEORGE W. BECKER, a citizen of the United States, residing at Massillon, in the county of Stark and State of Ohio, have invented a new and useful Meat-Tenderer, of which the following is a specification.

This invention relates to meat tenderers and more particularly to an improved device for preparing meat for cooking, being especially adapted to operate upon steaks.

The objects of the invention are the provision of a device for mashing or breaking the fiber of steak or other meat in order to make it tender, to generally improve and simplify devices of this character, and to provide a meat tenderer which will be simple and inexpensive to manufacture and durable and efficient in operation.

In the drawings, Figure 1 is a plan view of a meat tenderer embodying the invention, and Fig. 2 is a section on the line 2—2, Fig. 1.

Similar numerals of reference indicate corresponding parts throughout the several figures of the drawing.

The numeral 1 indicates the table upon which the device is built, said table being preferably formed of sheet metal as shown and provided with the longitudinal strengthening flanges 2, the rear end thereof being curved downwardly at 3 to allow the meat to more easily pass thereover, and terminating in the rearwardly disposed flange 4 adapted to receive the clamp 5 by means of which the device is rigidly connected to a kitchen table or the like, indicated in dot and dash lines at 6 in Fig. 2.

The forward extremities of the longitudinal flanges 2 terminate in bearings 7 which receive the shaft 8 of the corrugated roll 9, said roll being preferably provided with spaced longitudinal corrugations or ribs 10 as shown in Fig. 2.

Upwardly disposed bearing lugs 11 are formed near the rear portion of the table 1 and the arms 12 are pivotally connected thereto at their rear extremities, the forward portions of said arms being provided with the half-round enlargements 13 forming bearings for the shaft 14 upon which is mounted the serrated roll 15, said roll being preferably provided with a plurality of pyramidal spikes 16.

The forward extremities of the arms 12 are connected by means of the transverse member 17 which is provided with the spaced studs 18 extending between the spikes upon the roll 15, thus preventing the steak from adhering to said roll as it is passed through the device. If desired, a handle 19 may be provided upon the transverse member 17.

For the purpose of transmitting power to the roll 15, a power pulley 20 may be provided upon the shaft 14, a hand crank 21 being also provided upon said shaft for manually operating the device.

In order to provide a continuous tension upon the arms 12 to normally urge the roll 15 toward the roll 9, coil springs 22 are provided between the side flanges of the table and the arms 12, adjusting screws 23 being provided for the purpose of adjusting the tension upon the springs to accommodate meat of varying thicknesses.

It will be evident from the foregoing description that a very simple and practical device is provided by means of which cuts of meat, especially steak, which may be too tough to cook without breaking or mashing the fiber, may be quickly and easily tendered, the tension springs providing sufficient pressure to cause the spikes upon the upper roll to bite into the meat, breaking or tearing the fiber, while the corrugations upon the lower roll will quickly and readily feed the meat through the device while at the same time, assisting in breaking the fiber of the meat. If there should be any bone in the meat, it will not injure the device as the tension springs will allow the arms 12 to raise sufficiently to permit the bone to pass through the rolls.

I claim:—

1. A device of the character described comprising an elongated table downwardly curved at one end and terminating in an attaching flange, a serrated roll journaled in the opposite end portion of the table, upwardly disposed ears provided at the downwardly curved end of the table, a pair of arms pivotally connected to said ears, a serrated roll journaled in said arms and arranged to coöperate with the roll in the table, means for normally urging said arms toward the table and means for rotating one of said rolls.

2. A device of the character described, comprising a table, a corrugated roll journaled therein, a frame hingedly mounted upon said table, a spiked roll journaled in said frame and arranged to coöperate with the corrugated roll, studs carried by said frame and extending between the spikes of said spiked roll, and tension springs for normally urging said frame into engagement with said table.

In testimony that I claim the above, I have hereunto subscribed my name.

GEORGE W. BECKER.